Sept. 1, 1931.  F. F. FOWLE  1,821,887
WIRE CABLE
Filed Aug. 25, 1924
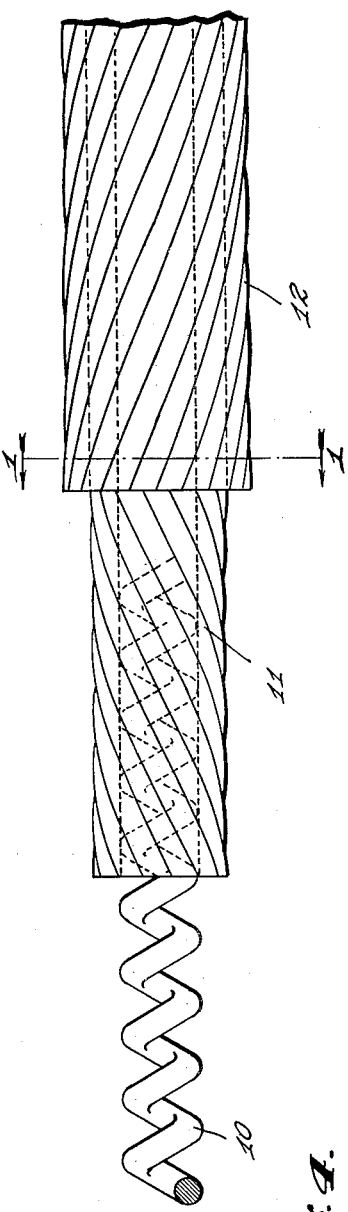
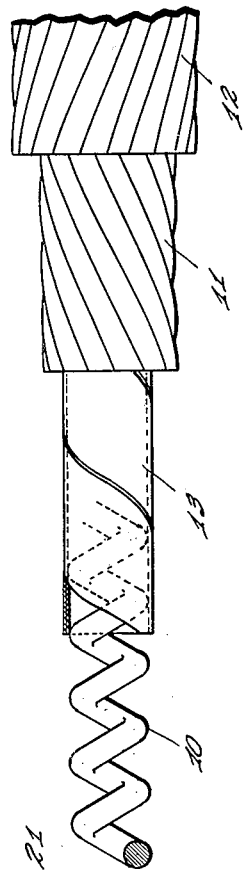
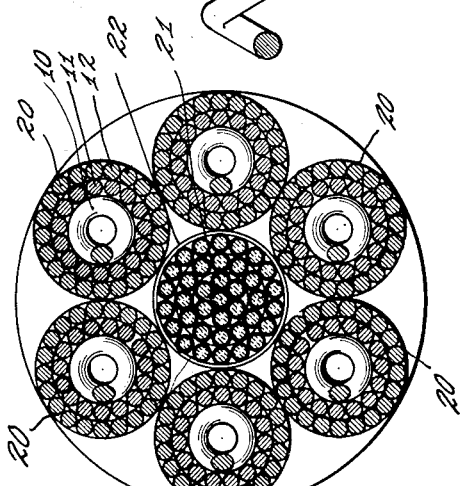
INVENTOR.
FRANK F. FOWLE,
BY
G. B. Schley
ATTORNEY.

Patented Sept. 1, 1931

1,821,887

UNITED STATES PATENT OFFICE

FRANK F. FOWLE, OF KENILWORTH, ILLINOIS, ASSIGNOR TO INDIANA STEEL & WIRE COMPANY, OF MUNCIE, INDIANA, A CORPORATION OF INDIANA

WIRE CABLE

Application filed August 25, 1924. Serial No. 733,971.

It is the object of my invention to make a hollow stranded cable, so that there will be a minimum of metal at the center of the cable, and so that for the same quantity of metal the cable will have a larger diameter.

The advantages of this construction in the electrical arts are two-fold. Firstly it is possible by this means to secure better penetration or diffusion of electric current, especially currents which change very rapidly, throughout the cross-section of the individual strands in the cable. Secondly it is possible to work such a cable at higher electrical potentials without electrically rupturing the dielectric medium in which it is placed, than would be the caase if the same cross-section of metal were disposed more compactly within a smaller diameter.

In carrying out my invention, I provide a core consisting of a relatively short-pitch open helix, desirably a single helix; and on this short-pitch helix I wind one or more complete layers of wires wound helically with a relatively long pitch, each layer of long-pitch wires being a complete layer comprising a sufficient number of wires so that adjacent wires are substantially in contact with each other; and between the core and the superposed layer or layers of wires I provide a protecting and supporting metallic sheath of structural metal, desirably formed of a metal or metals which tend to reduce or prevent corrosion of the cable wires.

The accompanying drawings illustrate my invention: Fig. 1 is a transverse section through a hollow strand cable embodying my invention, being taken substantially on the line 1—1 of Fig. 2; Fig. 2 is a longitudinal elevation of such strand cable, with the core and the successive layers projecting different distances in order better to show the construction; Fig. 3 is a view somewhat similar to Fig. 2, showing a modification in which the short-pitch helical core is separated from the superposed strand-layers by a helically wound bi-metallic strip or ribbon; and Fig. 4 is a transverse section through a rope-lay cable in which the outer strands are cables of the type shown in Fig. 1 and the central strand is formed of steel wires.

In accordance with my invention, I provide a core 10 which is made up of a short-pitch helical winding, desirably though not necessarily of a single wire wound into a single helix. As shown, this core 10 is a right-hand helix. The turns of this helix are desirably spaced apart to some extent, as is evident from Figs. 2 and 3, which makes for lightness and flexibility. Superposed upon the short-pitch helical core 10 are any suitable number of strand-layers 11 and 12, shown here as two in number. Each of these strand-layers consists of a number of wires, sufficient to make a complete circumferential layer with adjacent wires substantially in contact. The wires forming each strand-layer are helically wound, to form a multiple long-pitch helix. The pitch of the core-helix 10 is desirably only a fraction of that of the helixes 11 and 12. Adjacent strand-layers are desirably wound oppositely, and the innermost strand-layer is desirably wound opposite to the core 10; so that if the core 10 is a right-hand helix, the strand-layer 11 is a multiple left-hand helix, the strand-layer 12 is a multiple right-hand helix, and so on. With this construction, the metal of the cable is largely disposed toward the outside. This makes a lighter cable for a given outside diameter. It also makes a more flexible cable, for the spaced turns of the helical core 10 tend to permit easy bending. There is no metal directly at the center of the cable, and the spacing of the turns of the helical core 10 reduces the quantity of metal.

The wires of the core 10 and of the various strand-layers 11 and 12 may be of any desired metals. It is frequently desirable to make the wires of one or all of the strand-layers 11 and 12 of one metal and the core of another metal. For instance, the wires of the strand-layers 11 and 12 may be of a metal of high conductivity, such as copper, and the wire of the core helix 10 of a stronger metal, such as steel, of sufficient strength to withstand diametral deformation. The steel wire of the core 10 may be copper-clad steel or zinc-coated steel.

In addition, the core 10 and the adjacent strand-layer 11 are separated by a metallic sheath 13 formed of a tape of structural metal helically wound upon the short-pitch core-helix 10 and furnishing a support for the superposed long-pitch strand-layer 11. This sheath of structural-metal tape has several functions: It adds strength to the cable. It spans the gaps between adjacent turns of the open-helix core, and furnishes a complete and smooth cylindrical winding surface for the superposed layer of wires. It also serves quite effectively to prevent moisture from getting into the core. When the surfaces of the core 10 and of the adjacent strand-layer 11 are of different metals, as for instance of zinc-coated steel and of copper respectively, it is not only desirable to prevent direct contact between them by such sheath 13, but it is preferable that the metal tape used in forming such sheath be a bi-metallic strip, as is shown in Fig. 3. This construction using the bi-metallic strip between adjacent inner and outer layers in a strand cable is broadly claimed in my co-pending application Serial No. 719,243, filed June 11, 1924; and is only claimed here in the specific construction in which the bi-metallic strip is upon a hollow helical core. This be-metallic strip 13 may take any suitable form, of which several are shown in said co-pending application; but, as here illustrated, this strip is wound spirally with open joints. The bi-metallic strip has its outer and inner surfaces of the same metals as those of the surfaces of the wires with which said strip-surfaces respectively abut. In other words, if the outer strand-layers 11 and 12 are of copper, the outer surface of the strip 13 is copper; and if the short-pitch helical core 10 is a zinc-coated steel wire, the inner surface of said strip is of zinc. This bi-metallic strip serves to prevent or minimize corrosion by electrolytic action between the core 10 and the strand-layer 11 in the event that moisture gets into the cable, as is fully explained in my aforesaid co-pending application. For further protection against such electrolytic corrosion, the bi-metallic strip 13 may be coated with varnish or other moisture-resisting material, either over the entire strip or only at the edges thereof.

The cables such as shown in Figs. 1, 2, and 3 may be used as individual complete cables, or as strands to build up any desired types of cables. Such use as strands may be in any desired way, whether or not all the strands are of the same type of cable.

I have shown one illustration of this in Fig. 4. In that figure a rope-lay cable is shown with the individual outer strands 20 formed of cables of the same general type as that shown in Figs. 1 and 2. These cables are laid upon a core 21, in the usual rope-lay. The core 21 in this example is shown as made of a 37-wire concentric-lay cable with the wires all of steel, which wires are advantageously zinc-coated. With this arrangement, with the wires of the core 21 of zinc-coated steel, I preferably separate such core 21 from the superposed strands 20 by a bi-metallic ribbon 22 in those instances where the wires 12 of the strands 20 are of copper; as is one advantageous construction. This bi-metallic ribbon 22 is similar to the bi-metallic ribbon 13 already described, with its inner surface of zinc and its outer surface of copper. The particular metals used in the bi-metallic strip depend upon the metals of the surfaces of the wires which such strip engages.

I claim as my invention:—

1. A single-conductor wire cable, comprising a hollow core formed of a relatively short-pitch open helix of wire of one metal, a layer of wire of another metal wound helically with relatively long pitch superposed on said hollow core, and a metal tape forming a sheath interposed between said hollow core and the adjacent superposed layer of wires and having its outer surface of the same metal as the surface of the wires of said layer of wires.

2. A single-conductor wire cable, comprising a hollow core formed of a relatively short-pitch open helix of wire having its surface of one metal, a layer of wire of another metal wound helically with relatively long pitch superposed on said hollow core, and a bi-metallic strip interposed between said different metals and having surfaces of metals which are the same as the metals they respectively engage.

3. A single-conductor wire cable, comprising a hollow core formed of a relatively short-pitch open helix of zinc-coated steel wire, a layer of copper wire wound helically with relatively long pitch superposed on said hollow core of zinc-coated steel wire, and a bi-metallic strip interposed between the zinc-coated steel wire and the copper wire and having surfaces of the same metals as the surfaces which they respectively engage.

4. A single-conductor wire cable, comprising a hollow core formed of a relatively short-pitch open helix of wire, a metallic sheath of structural-metal tape wound directly on said open helix, and a layer of wire wound helically with relatively long pitch directly upon said sheath.

5. A single-conductor wire cable, comprising a hollow core of a relatively short-pitch open helix of steel wire, a metallic sheath of structural-metal tape directly upon said open helix, and a layer of wire of higher conductivity than steel wound helically with relatively long pitch directly upon said sheath.

6. A single-conductor wire cable, comprising a hollow core formed of a relatively short-pitch open helix of wire of high strength, a metallic sheath of structural-metal tape directly upon said open helix, and a layer of wire of high conductivity wound helically with relatively long pitch directly upon said sheath.

In witness whereof, I have hereunto set my hand at Indianapolis, Indiana, this 15th day of August, A. D. one thousand nine hundred and twenty-four.

FRANK F. FOWLE.